United States Patent
Mitchem et al.

(10) Patent No.: US 6,606,322 B2
(45) Date of Patent: Aug. 12, 2003

(54) ROUTE LOOKUP CACHING FOR A FIBER CHANNEL SWITCH

(75) Inventors: William J. Mitchem, Lafayette, CO (US); John Retta, Lafayette, CO (US)

(73) Assignee: McData Corporation, Broomfield, CO (US)

(*) Notice: Subject to any disclaimer, the term of this patent is extended or adjusted under 35 U.S.C. 154(b) by 0 days.

(21) Appl. No.: 09/932,534

(22) Filed: Aug. 17, 2001

(65) Prior Publication Data

US 2003/0043816 A1 Mar. 6, 2003

(51) Int. Cl.[7] .............................................. H04L 12/54
(52) U.S. Cl. .................. 370/395.31; 370/392; 370/423
(58) Field of Search ................................ 370/389, 392, 370/400–406, 428, 423, 351, 391, 395.1–395.31

(56) References Cited

U.S. PATENT DOCUMENTS

| | | | |
|---|---|---|---|
| 5,488,608 A | * | 1/1996 | Flammer, III ............... 370/400 |
| 5,491,693 A | | 2/1996 | Britton et al. |
| 5,740,175 A | * | 4/1998 | Wakeman et al. .......... 370/397 |
| 5,991,299 A | * | 11/1999 | Radogna et al. ............ 370/392 |
| 6,032,190 A | | 2/2000 | Bremer et al. |
| 6,138,185 A | | 10/2000 | Nelson et al. ................. 710/33 |
| 6,185,203 B1 | * | 2/2001 | Berman ...................... 370/351 |
| 6,192,048 B1 | | 2/2001 | Nelson et al. .............. 370/380 |
| 6,195,703 B1 | * | 2/2001 | Blumenau et al. .......... 709/211 |

OTHER PUBLICATIONS

American National Standard for Information Systems, "Fibre Channel Fabric Generic Requirements (FC–FG) Rev. 3.5," Aug. 7, 1996.

* cited by examiner

*Primary Examiner*—Salvatore Cangialosi
(74) *Attorney, Agent, or Firm*—Hogan & Hartson L.L.P.

(57) ABSTRACT

A route caching design in a fiber channel switch for providing quick access to recently used D_ID and exit port combinations. The fiber channel switch has a plurality of ports, each are coupled to a central route look-up table. A cache is coupled to each port for storing D_ID to exit port association information received from the central route look-up table.

28 Claims, 6 Drawing Sheets

ROUTE LOOKUP CACHING FOR A FIBER CHANNEL SWITCH

BACKGROUND OF THE INVENTION

The present invention relates, in general, to the field of fibre channel switching technology. More particularly, the present invention relates to a route caching scheme for a receive port in a fibre channel switch.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

In a fibre channel switching environment, a module within the switching element determines the appropriate route for incoming frames based upon a particular destination ID value (D_ID) located within the frame header. The D_ID identifies the exit port associated with the incoming frame. In most applications, a route lookup table provides the translation from the D_ID to the appropriate exit port.

In prior approaches, the switch dedicates a unique route lookup table to each port. Since such route lookup tables must necessarily be large to accommodate all the possible associations between the incoming frame D_ID's and the corresponding exit ports, this approach requires a significant amount of memory.

SUMMARY OF THE INVENTION

The route caching design of the present invention provides a solution to the aforementioned problem, which is vastly superior to anything currently available. It not only provides quick access to recently used D_ID and exit port combinations, but it does so in an extremely efficient manner without requiring any significant design changes and with only a relatively straightforward alteration to existing processes for networking in a fibre channel switching environment.

Particularly disclosed herein is a method for routing a data frame through a fibre channel fabric. The fibre channel fabric is comprised of a first fibre channel switch that has a plurality of fibre channel ports. The fibre channel ports are operative for transmitting and receiving a data frame. A plurality of data caches are provided such that at least one data cache is coupled to at least one of the plurality of fibre channel ports. An association is created between an exit port and a destination identification. The association is stored in at least one data cache coupled to at least one of the plurality of fibre channel ports.

In another aspect, the present invention provides a method for storing a data frame route relationship in a fibre channel fabric. A cache is provided that is operatively coupled to a port of a first fibre channel switch. Associating an exit port of the fibre channel switch with a destination identification creates a data frame route relationship. The destination identification is a field of a data frame and represents an end location for transmitting said data frame. The association is then stored in the data cache.

Still further disclosed herein is a fibre channel fabric having reduced latency and increased through put capacity. The network comprises a fibre channel switch having a plurality of fibre channel ports embodied thereon for transmitting and receiving data frames. Continuing, a route control module is coupled to one of the fibre channel ports. The route control module provides the identity of an exit port in response to a request from the fibre channel port for the exit port. The request comprises a destination identification. The network also has a data cache coupled to the route control module. The data cache stores an association between the exit port and the destination identification.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
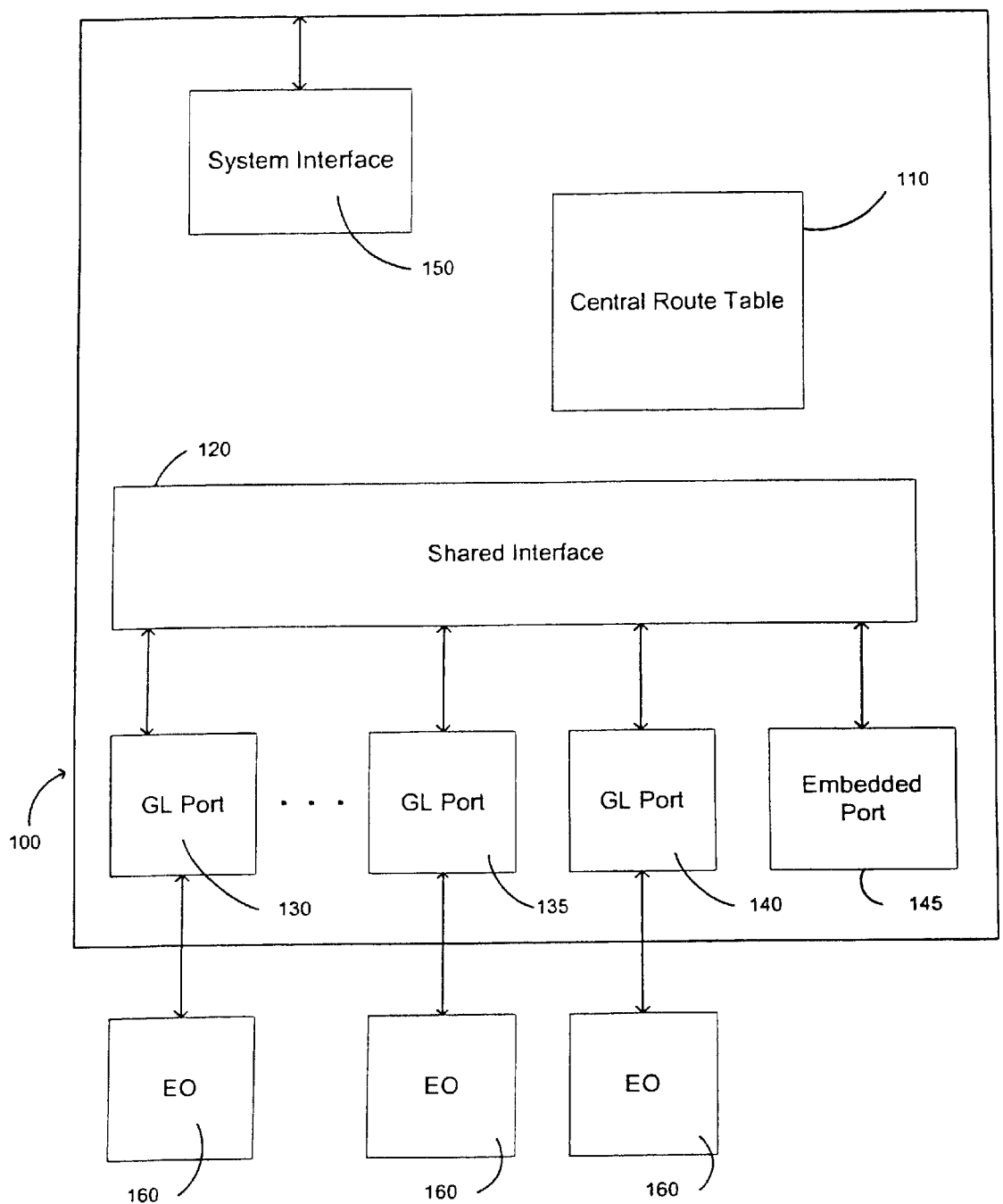
FIG. 1 is a block diagram of a switching element, wherein the switching element has a shared memory, a central route table and a plurality of fibre channel ports.

FIG. 1 shows a generalized block diagram of a fibre channel switch for use in a fibre channel fabric implementing the method and systems of the present invention. In one embodiment, the fibre channel switching element 100 of FIG. 1 may be implemented on a single application specific integrated circuit (ASIC). However, there are many implementations of switch 100 not shown, such as frame buffer memory could be located in each GL_Port in which case shared memory is replicated with a crossbar switch.

The fibre channel fabric associated with switch 100 is the method for connecting the various N-Ports of the devices together. In this way, the fabric is capable of routing fibre channel frames using only the destination identification information in the fibre channel frame header. The destination identification information identifies which N-Port receives the frame.

Fibre channel switch 100 has a plurality of ports for receiving and transferring data through the switch. In FIG.

1, the ports are illustrated as GL-ports 130, 135 and 140. In one embodiment, switch 100 comprises 24 GL__Port modules. Each GL__Port is coupled to shared memory 120 and external optical interface 160. External optical interface couples switch 100 to the N-Port, NL-Port or E-Port of the device coupled to the fibre channel fabric. Fibre channel switch 100 is associated with a central route table 110. Central route table 110 is operatively coupled to each GL-Port associated with fibre channel switch 100 (not shown in FIG. 1). Switch 100 also has a system interface 150. System interface module 150 provides interfaces to the power supply, fans, temperature sensor, LED's, and the serial interfaces of the optical transceivers.

Continuing, fibre channel switch 100 has an embedded port 145 in addition to illustrated GL__Ports 130, 135 and 140. Within the context of the invention, embedded port 145 may be used for several functions. First, it may provide a system services processor an access point for all of the fibre channel well-known addresses for both the reception and transmission of frames. Secondly, it may handle any fibre channel frame that cannot be delivered to a destination for either busy, reject, or timeout conditions. It may also be responsible for the generation, modification and/or interpretation of all Fibre Channel-Arbitrated Loop (FC-AL) initialization frames (such as LIFA, LIPA, LIHA, and LISA frames) for the GL-Ports operating in fabric loop mode. The embedded port interface is slightly different than that of an actual GL__Port module. Since the Fibre Channel-0/1 layers are not required, embedded port 145 does not implement the low-level interface for either primitive signaling or sequences. After the system services processor has completed initialization of embedded port 145, it enters and remains in the fibre channel active state.

Embedded port 145 provides a register set accessible to the system services processor for basic initialization and low level control. Once enabled, embedded port 145 is responsible for all functions related to the transmission and reception of frames to and from shared memory 120. For data path consistency within the following description, the direction of fibre channel frame flow is referenced to shared memory 120. Thus, a transmit (TX) path actually contains paths destined to, or received by, the embedded port from shared memory 120 and a receive (RX) path contains frames generated or transmitted by embedded port 145.

Embedded port 145 creates and consumes buffers that contain complete fibre channel frames. Frames may be held in SRAM coupled to embedded port 145. SRAM will typically hold two frames, one TX frame received from shared memory 120 and one RX frame waiting to be moved into shared memory 120. All other TX frames waiting to be read by embedded port 145 and RX frames previously created by embedded port 145 are stored in shared memory buffers. In one embodiment, embedded port 145 may be allocated up to 12 shared memory buffers for storage of RX frames. Typically, TX frames utilize the shared memory buffers allocated to the GL-Ports that receive the fibre channel frames.

For example, for fast turn-around of Arbitrated Loop address initialization frames, a TX frame may be modified in place in the embedded port SRAM by software and sent via an RX path without the need to move the frame. One of the shared memory buffers allocated to an embedded port may be designated as a protected buffer. The protected buffer can be filled with an RX frame that is transmitted frequently and left intact so that the frame can be sent to an exit port without the time delay of moving the frame from the extended port SRAM to the shared memory buffer.

An embedded port receiver (RX) is used to transfer frames from a system services processor to other ports in the switch 100. The Receiver module will be identical to the GL__Port RX module described hereinafter. Similarly, an embedded port transmitter (TX) is used to transfer frames from other ports via shared memory to a system services processor. The Transmitter module will be identical to the GL__Port TX module also described hereinafter. An Embedded Port Front End is used to transfer data between the Embedded Port SRAM and the TX and RX modules.

Shared memory 120 provides buffering and switching for all fibre channel frames that flow through switch 100. Received frames are written to shared memory 120 by the receiving port then read from shared memory 120 by the transmitting port. In one embodiment, shared memory 120 has 162 total frame locations shared by the GL-Ports 130, 135 and 140 and embedded port 145. In such an example, each port may be allocated as many as 12 buffers, so long as the total of 162 buffers is not exceeded.

Central Route Control module 110 provides a common route table for all ports in switch 100. Route table provides a translation from each possible Destination ID (D__ID) value to the appropriate exit port. Additionally, the route table provides for hard zoning, which is the capability for blocking traffic from certain receive ports to certain D__IDs. Each port uses an exit port request and response bus to communicate with central route table 110.

GL__Ports 130, 135 and 140 transmit and receive fibre channel frames to and from the switch and to and from the fibre channel fabric. As shown in FIG. 1, each GL__Port is coupled to an external optical interface 160 that in turn couples the port to the fabric and ultimately to the N__Port of the destination device.

GL__Ports may function as an E__Port, an F__Port or an FL__Port, to name a few. An E__Port is an expansion port that serves as a physical interface within the fabric that is used to create multi-switch fabrics by attaching another switches E__Port through an interswitch link (ISL). An F__Port is a fabric port that operates as a physical interface within the fabric that attaches to an N__Port of a destination device through a point-to-point link connection. An FL__Port is a fabric loop port that contains arbitrated loop (AL) functions associated with the FC-AL topology. FC-AL is a fibre channel topology where ports use arbitration to establish a point-to-point circuit.

Figure 2:
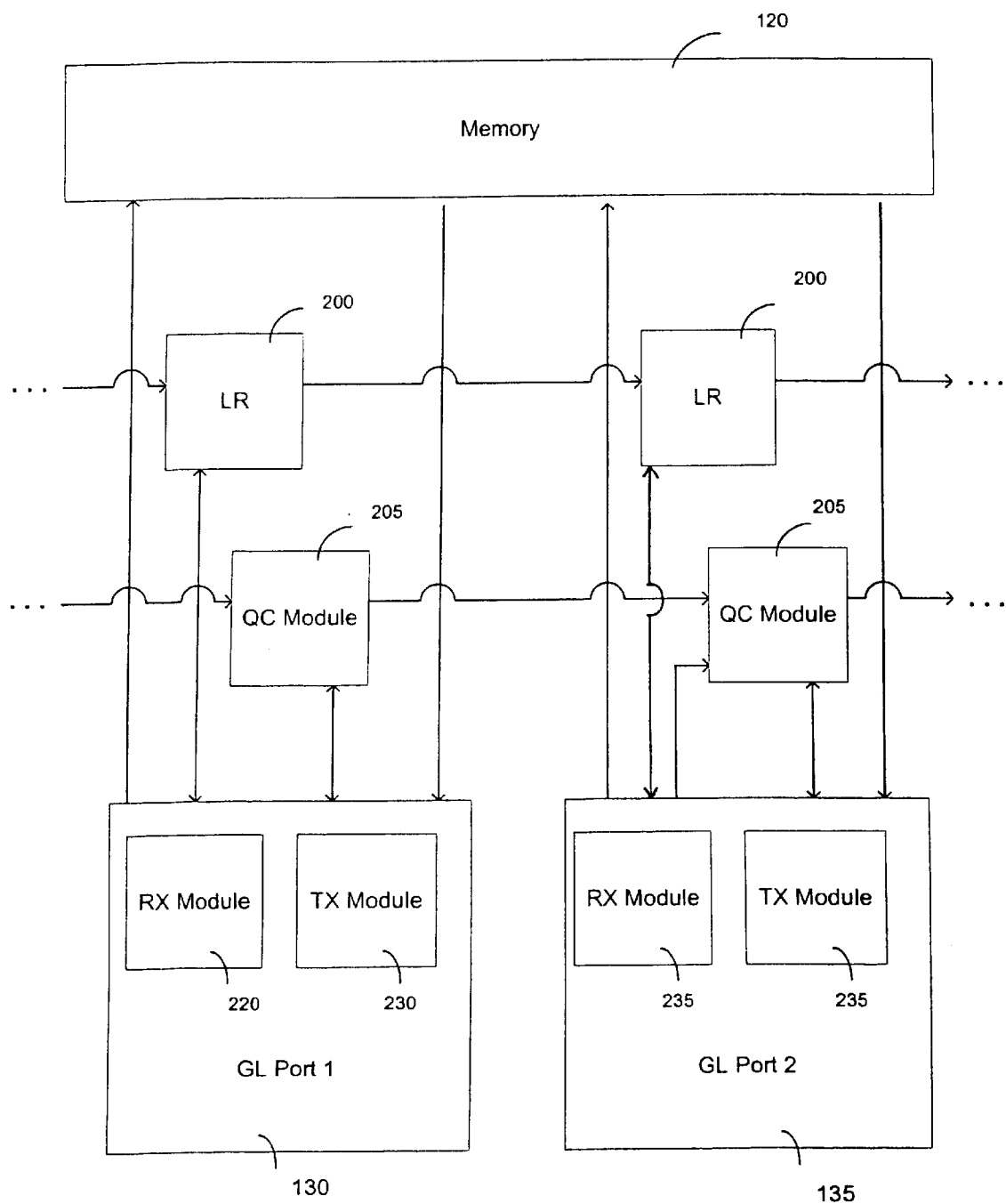
FIG. 2 is a detailed block diagram illustrating one embodiment of an interrelationship between modules of the switching element, particularly the fibre channel ports, local control route module, shared memory, and QC module.

FIG. 2 illustrates one possible method of connecting GL__Ports 130 and 135, as well as possible connections between the ports and shared memory 120 and local control route module 200. GL__Port 130 has a TX module 230 and an RX module 220 for sending and receiving frames. GL__Port 135 also has a TX module 235 and RX module 225. For example, if GL__Port 130 is the receiving port for a data frame and GL__Port 135 is the exit port for the data frame, the frame would first be sent from RX module 220 to shared memory 120 and then sent from shared memory 120 to TX module 235 as illustrated.

Continuing with the illustrated example of FIG. 2, RX port module of GL__Port 130 is coupled to TX port module of GL__Port 135 through a QC module 205. QC Control Module 205 acts as the control interface between the TX module 235 and RX module 220. QC Control Module 205 routes both a request and an acknowledgement signals between GL__Ports that serve to transmit exit port information and location of the fibre channel frame in shared memory from RX module 220 as well as return a successful frame transmission message from TX module 235.

Local route control module (LR) 200 is used by the GL_Port RX module to request the exit port for a frame based on the frame's destination ID value (D_ID). As shown in FIG. 2, a send and receive connection couples RX module 220 of GL_Port 130 with LR 200. The connection allows RX module 220 to request an exit port from the local control route module 200 and also for LR 200 to transmit the identity of the exit port back to RX module 220.

Figure 2A:
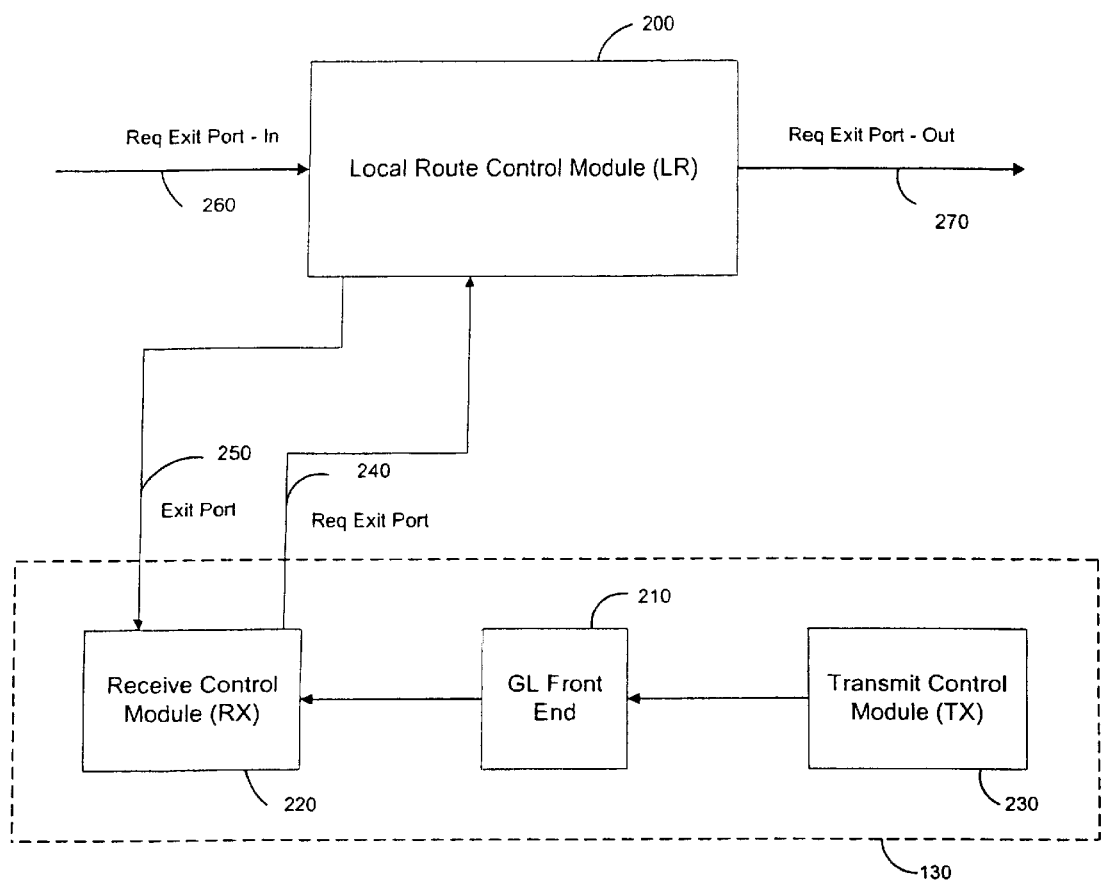
FIG. 2A is a block diagram illustrating a typical interface between a fibre channel port and a local route control module.

FIG. 2A illustrates the communication between GL_Port 130 and local route control module 200 in greater detail. TX control module 230 and RX control module 220 are coupled through fibre channel front end module 210. Fibre channel front end (FE) 210 provides the FC-0/1 level processing requirements. FE 210 includes all of the character level state machines required to support a fibre channel link, including all of the requirements for normal data frame processing. FE 210 provides an interface to the system services processor for low level control over the fibre channel link interface.

For the processing of frame traffic, FE 210 provides independent, symmetrical RX and TX interfaces to carry frame data. These paths consist of a data bus and control signals that identify the beginning and ending frame delimiters. For the RX path, status information about the frame including CRC validation, truncated frames and other pertinent status is also included as part of the signal.

Fibre channel front end 210 continuously monitors its receive link for the detection of a start of file (SOF) delimiter in the fibre channel frame. When an SOF is detected, FE 210 then forwards the frame to the RX module 220. RX module 220 stores the frame into the next available shared memory buffer. RX module 220 uses LR 200 to make a destination port routing decision from the header information of the received frame. RX module 220 then combines the shared memory buffer number into a field, which may be referred to as a Qentry field, which is passed to a TX module of the destination port through QC Module 205. RX module 220 then waits for the TX module to return the buffer number via an AckQEntry field. When RX module 220 receives the AckQEntry field it indicates to FE 210 that the buffer is being consumed.

The time that is required for all this processing is less than 1 microsecond. For this example it is most likely that RX module 220 is still storing the received frame while the TX module is transmitting the same frame, creating a cut-through switching effect. If the TX did not immediately transmit the frame, it is possible that the entire frame has been written into the buffer memory when transmission commenced, providing for a store and forward type of switching function.

The TX logic continuously monitors the bus coupling QC Controller 205 with TX module 230 for QEntries. When a QEntry is received, it is placed in TX module 230. When FE 210 is able to transmit a new frame, the queue selects a QEntry for processing. The shared memory buffer number for the frame to transmit is extracted from the QEntry and the TX module initiates a shared memory read operation. The frame data is then passed from the shared memory 120 to the FE 210. FE 210 transmits the frame.

Continuing with FIG. 2A, RX module 220 of port 130 is coupled to LR module 200 so as to request and receive exit port information. In one possible example, RX module 220 requests the identity of an exit port for a particular frame by sending a request over ReqExitPort connection 240 to LR 200. LR module 200 performs the necessary procedure for retrieving the exit port identity based on the transmitted D_ID. LR module 200 then transmits the generated exit port information to RX module 220 over ExitPort connection 250.

Figure 3:
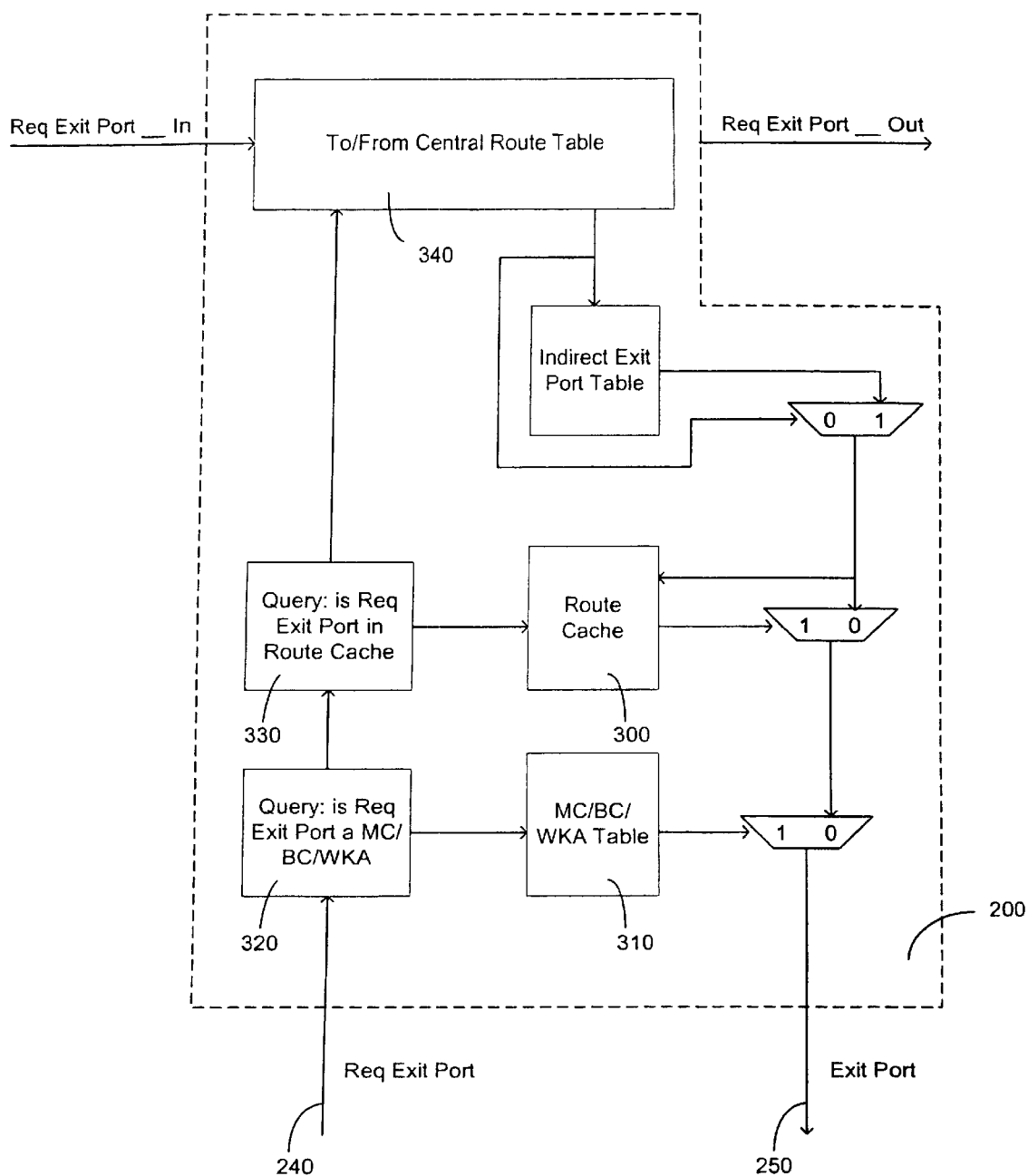
FIG. 3 is a detailed block diagram of a local route control module.
Figure 4:
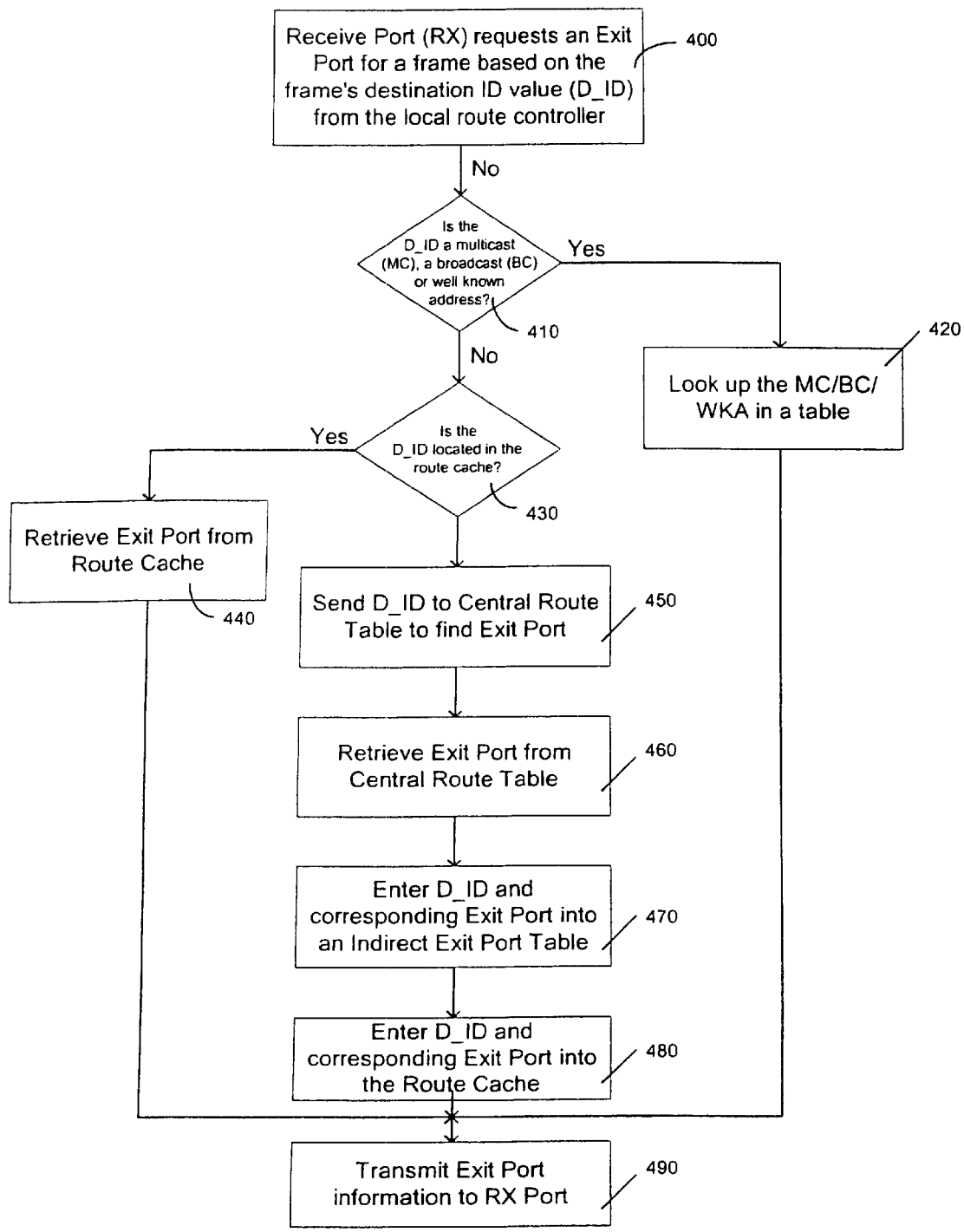
FIG. 4 is a flow chart for a data cache operation.

FIGS. 3 and 4 illustrate the operation of local route control module 200 in greater detail. Local route control module 200 is used by GL_Port RX module 220 to request an exit port for a fibre channel frame based on the frame's destination ID value (D_ID). In the illustrated example, the request for an exit port comes in on the ReqExitPort bus 240 to local route control 200.

RX module requests an exit port by providing a D_ID from the frame header to local route control module 200 (step 400). In one embodiment, the D_ID has 24 bits, starting with the 0 bit, which is represented by a designation [23:0]. The first operation 320 of local route control module 200 is to determine if the D_ID identifies a multicast (MC), a broadcast (BC) or a well known address (WKA) (step 410). Multicast and broadcast addresses are directed to a MC/BC/WKA table 310 to identify the exit port. Well-Known Addresses and FC-AL Loop Initialization addresses always result in the Embedded Port being selected as the Exit Port. Domain controller identifier addresses are sent to the central route table for exit port lookup unless a bit is set and the frame is not a class F frame, in which case the Embedded port is selected as the exit port.

If central route table 110 has not yet been initialized, then all frames are routed to the embedded port. All other D_ID values are forwarded to central route table 110. However, prior to forwarding a request for an exit port to central route table 110, LR 200 performs an operation 330 to determine whether an association between the requested D_ID and an exit port designation is found in route cache 300 (step 430). If the D_ID to exit port association is found in route cache 300, the exit port is available immediately. Route cache 300 improves latency by caching the most recent exit port lookups. In one embodiment, the sixteen most recent lookups are stored in cache 300. Cache 300 should be cleared when either the central route table 110 or indirect exit port table 350 is modified.

If the D_ID is not located in route cache 300, then local route controller 200 performs an operation 340 to send the D_ID to a central route table 110. Central route table 110 retrieves the D_ID to exit port association and returns it to local route controller 200. If applicable, the D_ID to exit port association is stored in an indirect exit port table 350 (step 470). As shown in step 480, D_ID to exit port association is stored in route cache 300. In the illustrated example, D_ID to exit port association is sent to RX module over ExitPort bus 250 (step 490).

Route cache 300 stores information received from central route lookup table 110, more particularly the most recent exit port lookups performed by local route controller 200. In one embodiment, the associations are stored in flip-flops. However, random access memory, content addressable memory or the like may be used without departing from the intended scope of the invention. Several algorithms may be used to store and remove associations in cache 300. In one embodiment, a least recently used algorithm may be utilized. In another embodiment, a least frequently used algorithm may be utilized.

Indirect exit port table 350 provides the capability for different RX Ports to send frames destined for the same D_ID out different TX Ports. This is useful when two or more inter-element links connect two switches together. Load balancing across inter-element links can be performed without modifying central route table 110 and affecting other ports. Indirect exit port table 350 may be embodied in flip-flops or random access memory to name a few.

Figure 5:
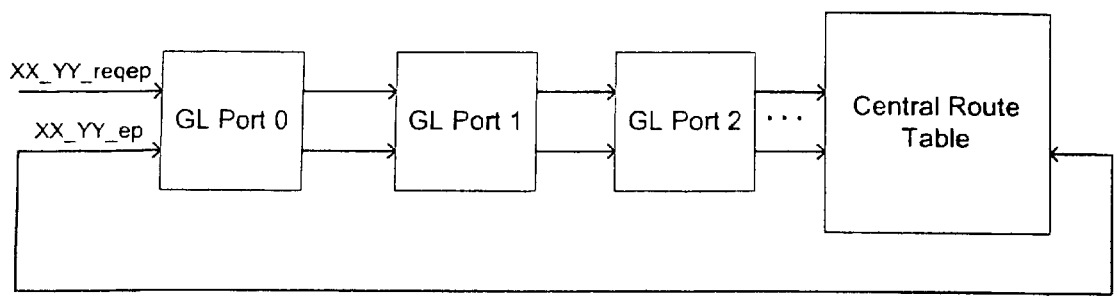
FIG. 5 is a block diagram of the request exit port bus and the exit port response bus.

FIG. 5 illustrates the structure of a request exit port bus ring structure. The request exit port bus is used by the receive controller of a GL_Port to request an exit port number for a given D_ID from the central route controller. The request exit port bus is designed to operate in a ring structure in which each module that is attached to the request exit port bus pipelines and re-powers the request exit port bus signals before sending them to the next module in the ring. The local route control module is used to provide the attachment to the request exit port bus for each module. The request exit port bus signals are described in Table 1.

TABLE 1

Request Exit Port Bus Signal Descriptors

| Signal | Bits | Description |
| --- | --- | --- |
| xx_yy_reqep_v | 1 | Valid bit. Set to '1' for 1 period when xx_yy_reqep_* signals are valid. A module may insert its request for an exit port on the bus when it detects that this bit is '0', indicating an empty time slot. |
| xx_yy_reqep_rxport | 5 | Receive Port Number. Indicates which receiver port is requesting an exit port. |
| xx_yy_reqep_d_id | 24 | Frame destination ID field (D_ID). |
| xx_yy_reqep_bid | 2 | Buffer Identifier. Used to guarantee in-order delivery of exit port information. |
| xx_yy_reqep_p | 1 | Odd Parity. A parity error is reported as a rare event and the request is disgarded. |

FIG. 5 also illustrates the exit port response bus ring. The exit port response bus is used by the central route controller to return an exit port number to an RX module of a GL_Port. The exit port response bus is designed to operate in a ring structure in which each module that is attached to the exit port response bus pipelines and re-powers the exit port response bus signals before sending them to the next module in the ring.

The central route controller may insert an exit port response on the bus in any clock cycle. A local route control module will extract the exit port response from the bus if it is addressed to that GL_Port. The local route control module is used to provide the attachment to the exit port response bus for each module. The exit port response bus signals are described in Table 2.

TABLE 2

Exit Port Response Bus Signal Descriptors

| Signal | Bits | Description |
| --- | --- | --- |
| xx_yy_ep_v | 1 | Valid bit. Set to '1' for 1 period when all xx_yy_ep_* signals are valid. Always set to '1' by the central route control module. Cleared to '0' by the GL_Port, addressed by xx_yy_ep_rxport, that receives the exit port information. |
| xx_yy_ep_err | 2 | Error Status. 00: OK, 01: Parity Err, 10: Bad D_ID, 11: Zone Blocked. |
| xx_yy_ep_rxport | 5 | Receive Port Number. Indicates which receive port that the exit port information is destined for. |
| xx_yy_ep_indirect | 1 | Indirect Lookup Required Bit. When set to '1' the Indirect Lookup Table, addressed by xx_yy_ep_txport [3:0], must be used for determining the exit port. |

TABLE 2-continued

Exit Port Response Bus Signal Descriptors

| Signal | Bits | Description |
| --- | --- | --- |
| xx_yy_ep_txport | 5 | Transmit Port. Identifies the exit port to which a frame must be sent. xx_yy_ep_txport [3:0] addressed the Indirect Lookup Table when the indirect bit is set to '1'. |
| xx_yy_ep_bid | 2 | Buffer Identifier. Used to guarantee in-order delivery of exit port information. |
| xx_yy_ep_p | 1 | Odd Parity. A parity error is reported as a rare event and the exit port information is disgarded. |

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for routing a data frame through a fibre channel fabric, said fibre channel fabric comprising a first switch having a plurality of ports, said ports are operative for transmitting and receiving said data frame, said method comprising:
supplying a data frame to a selected port, wherein the data frame has an associated destination identification;
providing a plurality of route caches, at least one route cache coupled to said selected port;
creating an association between an exit port and a destination identification; storing said association in said at least one route cache; and using the selected port, transferring the supplied data frame from the selected port to the exit port.

2. The method of claim 1, further comprising moving said data frame from memory operatively coupled to said first switch to said exit port based on said association.

3. The method of claim 1, wherein said act of storing comprises storing the sixteen most recent associations for said selected port.

4. The method of claim 1 further comprising the act of retrieving said association from said route cache in response to receiving a data frame in said selected port when it is determined that the received data frame is associated with a destination identification represented in said at least one cache.

5. The method of claim 1, further comprising:

providing a route controller, said route controller comprising said route cache and coupled to a central route table, said route controller coupled to said one of said plurality of ports wherein a request for said exit port is sent from said one of said plurality of fibre channel ports to said route controller, said request having said destination identification;

determining if said association is stored in said route cache; and returning said association to said one of said plurality of fibre channel ports when said association is found in said at least one route cache.

6. The method of claim 5 further comprising locating said association in said central route table when said association is not found in said route cache and thereafter storing said association in said route cache.

7. The method of claim 1, wherein each of said plurality of route caches is associated with a single port.

8. The method of claim 1, wherein said destination identification is located in a field of said data frame, and said destination identification indicates a destination location of the data frame.

9. The method of claim 8, wherein said destination location is a device coupled to said first switch by an external optical interface through said at least one of said plurality of fibre channel ports.

10. The method of claim 1 further comprising the step of replacing an association in said data cache based on a Least Recently Used algorithm.

11. The method of claim 1 further comprising the step of replacing an association in said data cache based on a Least Frequently Used algorithm.

12. A method for storing a data frame route relationship in a fibre channel fabric, said method comprising:

providing a cache operatively coupled to a port of a first fibre channel switch;

creating said data frame route relationship by associating an exit port of said fibre channel switch with a destination identification, wherein said destination identification is associated with a data frame and represents a destination location for transmitting said data frame;

storing said association in said data cache while the data frame resides in the port.

13. The method of claim 12, wherein said exit port is coupled to said end location.

14. The method of claim 12, wherein said end location is a device coupled to said exit port through an external optical interface.

15. The method of claim 13, wherein said exit port is an F-port and said device is an N-port in said fibre channel fabric.

16. The method of claim 12, wherein said step of storing further comprises the act of storing at least sixteen most recent associations.

17. A method for retrieving an association stored in a data cache in a fiber channel fabric, said method comprising:

at a fibre channel switching port, requesting an exit port from a route control module based on a destination identification;

at said route control module, querying said data cache for an exit port associated with said destination identification; and returning said exit port associated with said destination identification from said route control module to said fibre channel switching port if said destination identification is found in said data cache.

18. The method of claim 17 further comprising the step of storing an association between said destination identification and said exit port at said data cache if said route control module queries said data base for said destination identification and said destination identification is not found.

19. A fibre channel fabric having reduced latency and increased through put capacity comprising:

a switch having a plurality of ports embodied thereon for transmitting and receiving data frames;

a route control module coupled to at least one of said ports, said route control module for providing an identification of an exit port in response to a request from said port for said exit port, said request comprising a destination identification; and a cache coupled to said route control module for storing an association between said exit port and said destination identification.

20. The fibre channel fabric of claim 19, wherein said port comprises a receive control module communicating with said route control module for determining said exit port identification and moving a data frame to memory shared by a plurality of ports in said fibre channel fabric using said exit port.

21. The fibre channel fabric of claim 19 further comprising a request exit port bus coupling said port to said route control module for transmitting a request exit port bus signal, wherein said request exit port bus operates in a ring structure such that each route control module re-powers said exit port bus signal before transmitting it to the next route control module in said ring structure.

22. The fibre channel fabric of claim 19 further comprising an exit port response bus coupling said fibre channel port to said route control module for transmitting a request exit port response bus signal, wherein said request exit port response bus operates in a ring structure such that each route control module re-powers said exit port response bus signal before transmitting it to the next route control module in said ring structure.

23. The fibre channel fabric of claim 19, wherein said cache comprises Random Access Memory.

24. The fibre channel fabric of claim 19, wherein said cache comprises a plurality of flip-flops.

25. The fibre channel fabric of claim 19, wherein said cache comprises content addressable memory.

26. The fibre channel fabric of claim 19, wherein said port further comprises a receive module that sends said request from said port for said exit port.

27. A fibre channel switch comprising:

a plurality of ports;

a central route look-up table; and a cache coupled to each port for storing information from said central route look-up table.

28. A fibre channel port comprising:

an interface to a central route look-up table;

a cache for holding information from said route look-up table; and an interface for receiving a data frame and a destination identification associated with said frame.

* * * * *